United States Patent
Harjanto (10) Patent No.: US 10,402,557 B2
(45) Date of Patent: Sep. 3, 2019

(54) VERIFICATION THAT AN AUTHENTICATED USER IS IN PHYSICAL POSSESSION OF A CLIENT DEVICE

(71) Applicant: Uniloc Luxembourg S.A., Luxembourg (LU)

(72) Inventor: Dono Harjanto, Irvine, CA (US)

(73) Assignee: Uniloc 2017 LLC, Wilmington, DE (US)

( * ) Notice: Subject to any disclaimer, the term of this patent is extended or adjusted under 35 U.S.C. 154(b) by 237 days.

(21) Appl. No.: 14/825,120

(22) Filed: Aug. 12, 2015

(65) Prior Publication Data

US 2016/0070895 A1 Mar. 10, 2016

Related U.S. Application Data

(60) Provisional application No. 62/048,731, filed on Sep. 10, 2014.

(51) Int. Cl.
| | | |
|---|---|---|
| *G06F 21/34* | (2013.01) |
| *G06F 21/44* | (2013.01) |
| *H04L 29/06* | (2006.01) |
| *H04W 12/00* | (2009.01) |

(52) U.S. Cl.
CPC .............. *G06F 21/44* (2013.01); *G06F 21/34* (2013.01); *H04L 63/08* (2013.01); *H04L 2463/082* (2013.01); *H04W 12/00508* (2019.01)

(58) Field of Classification Search
CPC ........... G06F 21/44; G06F 21/34; H04L 63/08
USPC .......................................................... 726/30
See application file for complete search history.

(56) References Cited

U.S. PATENT DOCUMENTS

| | | |
|---|---|---|
| 5,027,398 A | 6/1991 | Miyoshi |
| 6,006,328 A | 12/1999 | Drake |
| 6,330,670 B1 | 12/2001 | England et al. |
| 7,237,264 B1 | 6/2007 | Graham et al. |
| 7,457,951 B1 | 11/2008 | Proudler et al. |
| 8,181,032 B2 | 5/2012 | Prakash et al. |
| 8,196,176 B2 | 6/2012 | Berteau et al. |
| 2003/0033541 A1 | 2/2003 | Edmark et al. |

(Continued)

FOREIGN PATENT DOCUMENTS

| | | |
|---|---|---|
| AU | 2011200413 | 9/2011 |
| WO | WO 2008/034900 | 3/2008 |

OTHER PUBLICATIONS

Devadas et al., "Physical Unclonable Functions and Applications," MIT, Feb. 6, 2007.

(Continued)

*Primary Examiner* — Jason K Gee
*Assistant Examiner* — Angela R Holmes
(74) *Attorney, Agent, or Firm* — Sean D. Burdick (57) ABSTRACT

An authentication server determines that a user entering authentication data is in physical possession of a client device by determining that the user has observed changes in the state of hardware elements of the client device that are effected outside of a remote desktop protocol. The authentication server causes the client device to prompt the user to observe the hardware element of the client device for state changes and receives data generated by the user representing observed state changes. If the data accurately represents the changes in the state of the hardware element, the user is determined to be in physical possession of the client device.

15 Claims, 10 Drawing Sheets

(56) References Cited

U.S. PATENT DOCUMENTS

| | | |
|---|---|---|
| 2003/0217289 A1 | 11/2003 | Ammon et al. |
| 2004/0172558 A1 | 9/2004 | Callahan et al. |
| 2004/0254890 A1 | 12/2004 | Sancho et al. |
| 2005/0144449 A1* | 6/2005 | Voice .................. G06F 21/34 713/169 |
| 2005/0273600 A1 | 12/2005 | Seeman |
| 2007/0266447 A1 | 11/2007 | Hollander |
| 2008/0040802 A1 | 2/2008 | Pierson et al. |
| 2008/0168564 A1 | 7/2008 | Lerouge et al. |
| 2009/0006861 A1 | 1/2009 | Bemmel |
| 2009/0083184 A1 | 3/2009 | Eisen |
| 2009/0251417 A1* | 10/2009 | Pate .................. G06F 3/0238 345/168 |
| 2009/0287938 A1 | 11/2009 | Prakash et al. |
| 2010/0162393 A1 | 6/2010 | Sobel et al. |
| 2010/0306819 A1 | 12/2010 | Nahari et al. |
| 2010/0328074 A1* | 12/2010 | Johnson ................ G06F 21/31 340/573.1 |
| 2012/0124372 A1 | 5/2012 | Dilley et al. |
| 2012/0167208 A1 | 6/2012 | Buford et al. |
| 2012/0284499 A1 | 11/2012 | Prakash et al. |
| 2014/0115349 A1* | 4/2014 | Chen .................. G06F 9/4418 713/300 |

OTHER PUBLICATIONS

Patil et al., "I3FS: An In-Kernel Integrity Checker and Intrusion Detection File System," Proceedings of LISA '04: Eighteenth System Administration Conference, Nov. 2004, Atlanta, GA, pp. 67-78.

Philip, Abin Oommen, "Using Mobile Phones as Software Token for Generating Digital Signature Code—Digitally Signing an Online Banking Transaction," *Computational Science—New Dimensions & Perspectives*, 2011, pp. 118-121.

TriCipher, Inc., "Protecting Online Transactions," Jun. 2007, 12 pages.

* cited by examiner

VERIFICATION THAT AN AUTHENTICATED USER IS IN PHYSICAL POSSESSION OF A CLIENT DEVICE

This application claims priority to U.S. Provisional Application 62/048,731, filed on Sep. 10, 2014, which is fully incorporated herein by reference.

BACKGROUND OF THE INVENTION

1. Field of the Invention

The present invention relates generally to network-based computer security and, more particularly, methods of and systems for authenticating a user of a device for computer network security.

2. Description of the Related Art

In some computer attacks, a device can be controlled by a person that is physically remote from the device. In such attacks, that person can use any of a number of Remote Desktop Protocols (RDPs) to control the device, even without physical possession of the device. However, that person may gain access to passwords and other authentication data stored on the device such that the person can spoof authentication of the legitimate user of the device and obtain services through the Internet that should not be authorized.

What is needed is a way to determine whether a person to be authenticated is in physical possession of the device carrying out the authentication session.

SUMMARY OF THE INVENTION

In accordance with the present invention, an authentication server determines that a user entering authentication data is in physical possession of a client device by determining that the user has observed changes in the state of hardware elements of the client device that are effected outside of a remote desktop protocol. The authentication server causes the client device to prompt the user to observe the hardware element of the client device for state changes and receives data generated by the user representing observed state changes.

The state changes are effected in the hardware element using logic that is independent of any WINDOWS® manager or other logic that interacts with RDP server logic. Accordingly, any RDP server logic that could be used by a user located remotely from the client device would be unaware of the particular state changes in the hardware element of the client device. For example, the DeviceIO-Control API of the WINDOWS® operating system available from Microsoft Corp. of Redmond, Wash. controls hardware elements independently of any WINDOWS® manager or RDP server logic.

Examples of state changes that only a user in physical possession of the client device could observe include flashing of indicator lights such as the Caps Lock indicator on a keyboard and sounds produced by a speaker on the motherboard of the device.

To avoid confusing the user, the state of the hardware element is determined prior to changing the state and is restored after the changes in the state are observed by the user. The user enters data representing the state changes observed by the user. If the data accurately represents the changes in the state of the hardware element, the user is determined to be in physical possession of the client device.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

In accordance with the present invention, an authentication server 108 (FIG. 1) authenticates a user of a handheld device 102 using data representing observation, by a user of device 102, of hardware elements that are controlled directly and outside any remote desktop protocol. One example of such a hardware element includes LED indicators on a keyboard. The user is prompted to observe the LED indicators of the keyboard and to report which LED indicator blinks and how many times it blinks. Since a person physically remote from device 102 or otherwise not in physical possession of device 102 cannot observe any hardware elements of device 102, such a person will be unable to accurately report any observed state changes in such hardware elements. Accordingly, a person in physical possession of device 102 can be readily distinguished from a person not in physical possession of device 102.

To facilitate appreciation and understanding of the present invention, operating system 1130 (FIG. 11) of device 102 and some components of operating system 1130 are described. Generally, an operating system (OS) such as OS 1130 is a set of programs that manage computer hardware resources and provide common services for application software that runs on the computing device. WINDOWS® manager 1132 is that part of OS 1130 that manages graphical user interface (GUI) elements that can be organized into a number of GUI windows through which the user interacts with the device. WINDOWS® manager 1132 processes user-generated signals created by the user through physical manipulation of one or more user input devices 1108 and attributes the user generated signals to particular processes executing in device 102 according to a hierarchy of windows presented on one or more user output devices 1110. In addition, all commands from processes executing in device 102 commanding changes in a display are processed by WINDOWS® manager 1130 to ensure that the commands are processed only to the extent a window corresponding to the process is not occluded by other windows. WINDOWS® manager 1130 also processes sounds from multiple processes executing in device 102 such that all processes can be heard.

Figure 11:
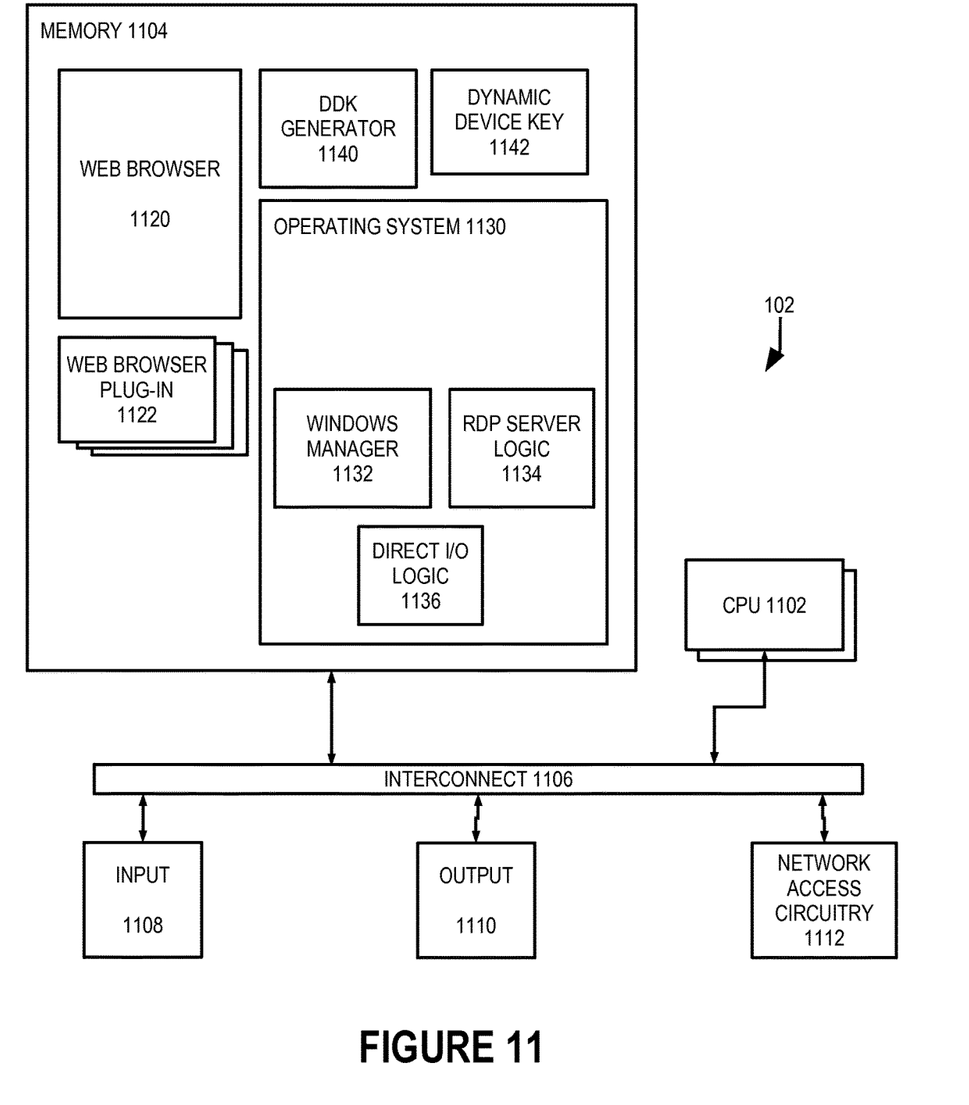
FIG. 11 is a block diagram showing in greater detail the device of FIG. 1.

RDP server logic 1134 of operating system 1130 allows a remote user, e.g., a user of device 110, to see a virtual desktop of device 102 on device 110. RDP server logic 1134 interacts with WINDOWS® manager 1132 to create the appearance of the desktop of device 102, i.e., all GUI windows currently displayed by device 102 in their respective positions and states, on device 110.

In addition, RDP server logic 1134 receives data representing user-generated data generated by the user of device 110 and treats that user-generated data as if it were generated by a local user of device 102. In effect, RDP server logic 1134 allows a remotely located user to interact with WINDOWS® manager 1132 as if the remote-located user were a local user directly interacting with user input devices 1108.

Direct input/output (I/O) logic 1136 of operating system 1136 directly manipulates hardware elements of device 102, such as user input devices 1108 and output devices 1110 for example. WINDOWS® manager 1132 can use direct I/O logic 1136, as can other processes executing within device 102. In this illustrative embodiment, direct I/O logic 1136 is the DeviceIOControl API of the WINDOWS® operating system available from Microsoft Corp. of Redmond, Wash. Other operating systems include other direct I/O logic.

Authentication system 100 (FIG. 1) includes device 102, a server 106, and authentication server 108 that are connected to one another through a wide area computer network 104, which is the Internet in this illustrative embodiment. Device 102 can be any of a number of types of networked computing devices, including smart phones, tablets, netbook computers, laptop computers, and desktop computers. Server 106 is a server that provides services to remotely located devices such as device 102 but that is configured to require authentication of the user of device 102 prior to providing those services. Authentication server 108 is a server that authenticates devices and users of such devices, sometimes on behalf of other computers such as server 106. In this embodiment, authentication server 108 is tasked with verifying that authentication of device 102 is performed by a user in physical possession of device 102 and not someone controlling device 102 from another device, such as device 110.

Device attributes are described briefly to facilitate understanding and appreciation of the present invention. In this illustrative embodiment, data representing observation by a user of device 102 of hardware elements that are controlled directly and outside any remote desktop protocol is combined with other attributes of device 102 and of the user to form a digital fingerprint of device 102. Such other attributes include hardware and system configuration attributes of device 102 that make up an internal state of device 102. Known device record 500 (FIG. 5) includes device attributes 504, both of which are described in greater detail below. Each device attribute 504 includes an identifier 506 and a value 508. Other than user observation data, examples of device attributes of device 102 include a serial number of a storage device within device 102 and detailed version information regarding an operating system executing within device 102. In the example of a serial number of a storage device, identifier 506 specifies the serial number of a given storage device (such as "C:" or "/dev/sda1") as the particular information to be stored as value 508, and value 508 stores the serial number of the given storage device of device 102.

For subsequent authentication of device 102, registration in the manner illustrated in transaction flow diagram 200 (FIG. 2) retrieves environmental data from device 102, wherein the environmental data represents a number of instances each of a number of predetermined gestures performed by the user.

Figure 2:
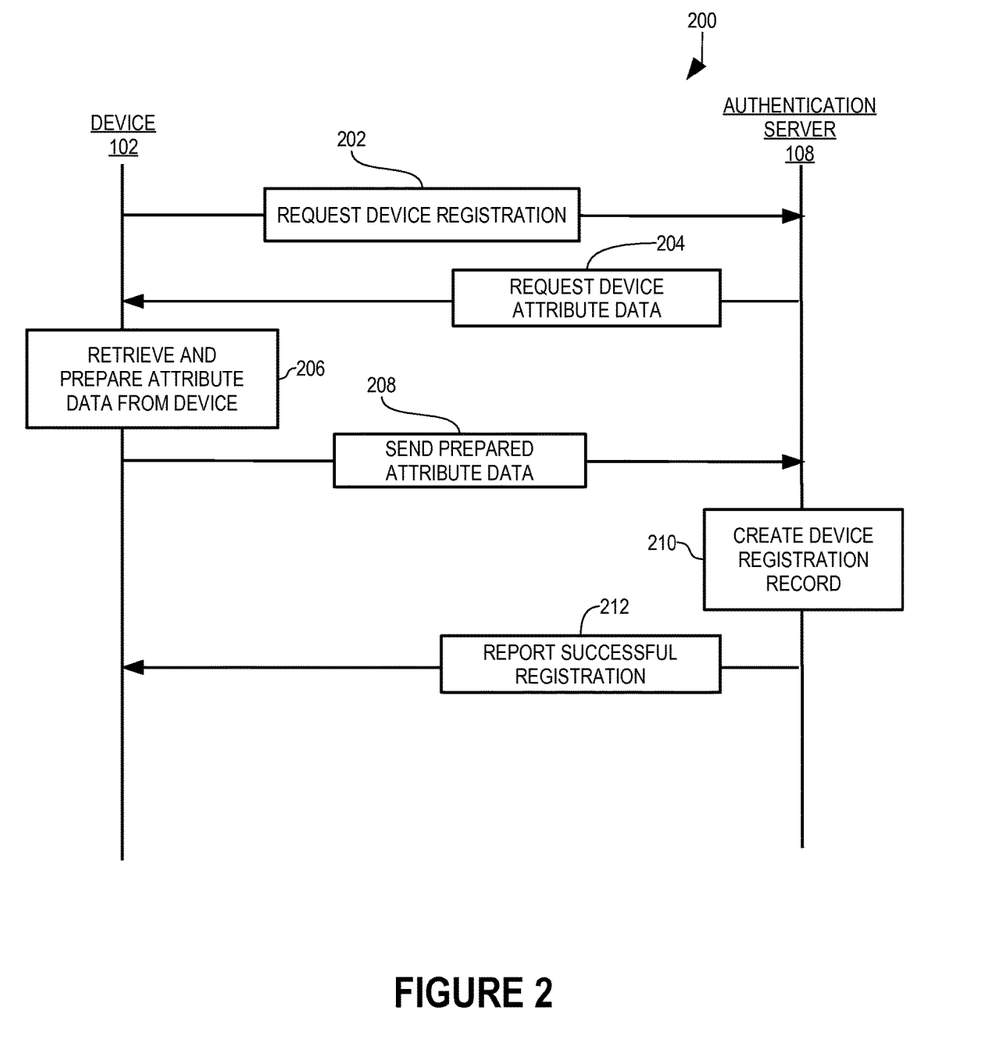
FIG. 2 is a transaction flow diagram illustrating the manner in which the device is registered with the authentication server for subsequent authentication.

In step 202, device 102 sends a request for registration to user authentication server 108. The request can be in the form of a URL specified by the user of device 102 using a web browser 1120 (FIG. 11) executing in device 102 and conventional user interface techniques involving physical manipulation of user input devices 1108. Web browser 1120 and user input devices 1108 and other components of device 102 are described in greater detail below.

In step 204 (FIG. 2), user authentication server 108 sends a request to device 102 for device attributes of device 102 and its user.

The request sent to device 102 includes content that causes web browser 1120 (FIG. 11) of device 102 to gather attribute data representing hardware and other configuration attributes of device 102. In one embodiment, a web browser plug-in 1122 is installed in device 102 and, invoked by web browser 1120, processes the content of the web page to gather the attribute data in step 206. In other embodiments, the attribute data can be gathered by other forms of logic of device 102, such as DDK generator 1140 installed in device 102. The various elements of device 102 and their interaction are described more completely below.

The content that causes web browser 1120 (FIG. 11) of device 102 to gather attribute data representing hardware and other configuration attributes of device 102 includes extraction logic 510 (FIG. 5) for each of the attributes web browser 1120 (FIG. 11) is to gather. In an alternative embodiment, DDK generator 1140 already includes extraction logic for all attributes and device 102 receives data identifying the particular attributes requested by authentication server 108. Extraction logic 510 (FIG. 5) defines the manner in which a client device is to extract data to be stored as value 508 of device attribute 504.

Figure 7:
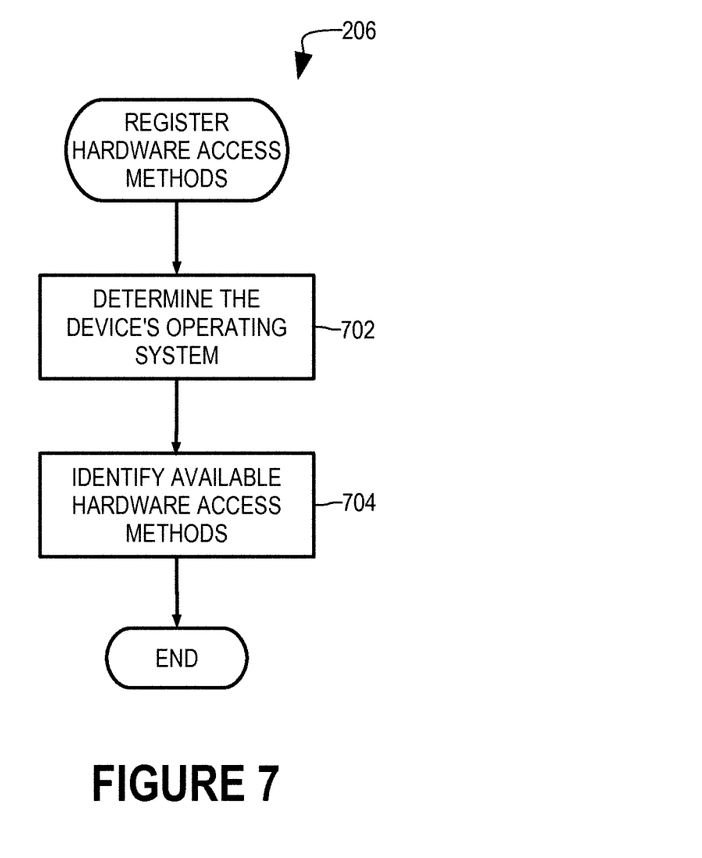
FIG. 7 is a logic flow diagram illustrating the extraction of environmental data representing performance of a number of gestures for registration of the device.

Step 206 for gathering attribute data regarding logged environmental data is shown in greater detail as logic flow diagram 206 (FIG. 7). In step 702, device 102 determines its operating system. Each operating system has its specific logic for accessing hardware elements of device 102 directly. In step 704, device 102 identifies hardware elements of device 102 and available methods (e.g., APIs) by which the hardware elements can be accessed. Device 102 stores data representing the available hardware access methods as available hardware access methods 402 (FIG. 4) in a hardware access record 400. After step 704, processing according to logic flow diagram 206, and therefore step 206 (FIG. 2), completes.

In this illustrative embodiment, device 102—in particular, web browser plug-in 1122 (FIG. 11) or DDK generator 1140—encrypts the attribute data using a public key of authentication server 108 and public key infrastructure (PKI), thereby encrypting the attribute data such that it can only be decrypted by authentication server 108.

In step 208 (FIG. 2), device 102 sends the attribute data that was gathered in step 206 to authentication server 108.

In step 210, authentication logic 1020 (FIG. 10) of authentication server 108 creates a device registration record for device 102 from the received attribute data. Authentication server 108 creates a device registration record in the form of known device record 500 (FIG. 5) for device 102 by creating a globally unique identifier for device 102 as device identifier 502 (FIG. 5) and storing the values of the respective attributes, including hardware access record 400, received in step 208 (FIG. 2) as value 508 (FIG. 5) in respective device attributes 504. Known device record 500 is described more completely below in greater detail.

In step 212 (FIG. 2), authentication server 108 sends a report of successful registration to device 102, providing device identifier 502 (FIG. 5) of device 102 for subsequent identification, particularly if it differs from the one generated by device 102. After step 212 (FIG. 2), processing according to transaction flow diagram 200 completes and device 102 is registered for subsequent authentication with authentication server 108.

Figure 4:
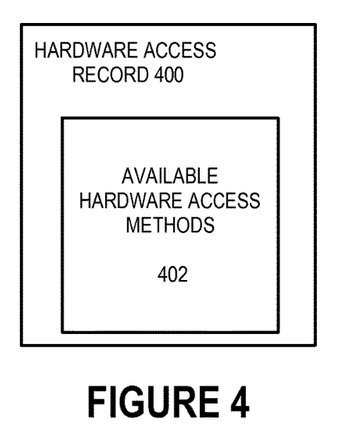
FIG. 4 is a block diagram of a gesture record to be used for authentication of the device of FIG. 1 and its user.

Known device record 500 (FIG. 5) is a registration record and, in this illustrative example, represents registration of device 102 and its user. Known device record 500 includes a device identifier 502 and a number of device attributes 504 which are described briefly above. Each device attribute 504 includes an identifier 506 specifying a particular type of information and a value 508 representing the particular value of that type of information from device 102. For example, if identifier 506 specifies a serial number of a given storage device, value 514 stores the serial number of that storage device within device 102. Similarly, if identifier 506 specifies a hardware element of device 102 to be manipulated, value 508 stores data representing the available hardware access methods. In this illustrative embodiment, value 508 stores the available hardware access methods in the form of hardware access record 400.

Device attribute 504 (FIG. 5) also includes extraction logic 510, comparison logic 512, alert logic 514, and adjustment logic 516. The particular device attribute represented by device attribute 504 is sometimes referred to as "the subject device attribute" in the context of FIG. 5.

Extraction logic 510 specifies the manner in which the subject device attribute is extracted by device 102. Logic flow diagram 206 (FIG. 7) is an example of extraction logic 510 for observation data representing user observation of changes in a state of hardware elements of device 102.

Figure 5:
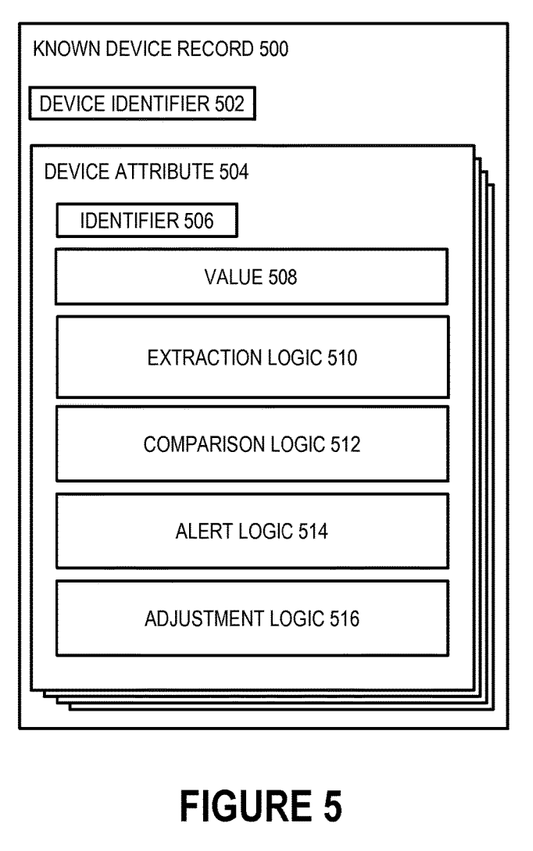
FIG. 5 is a block diagram of a known device record used by the authentication server to authenticate the device and its user.

Comparison logic 512 specifies the manner in which the subject device attribute is compared to a corresponding device attribute to determine whether device attributes match one another. For example, comparison logic 512 in this illustrative embodiment specifies logic by which received observation logic accurately describes changes in a state of hardware elements of device 102 as specified in extraction logic 510.

Alert logic 514 can specify alerts of device matches or mismatches or other events. Examples of alert logic 514 include e-mail, SMS messages, and such to the owner of device 102 and/or to a system administrator responsible for proper functioning of device 102.

Adjustment logic 516 specifies the manner in which the subject device attribute is to be adjusted after authentication. For example, if a hardware element of device 102 is changed, adjustment logic 516 can cause value 508 to be updated to represent currently available hardware access methods.

Device attribute 504 is shown to include the elements previously described for ease of description and illustration. However, it should be appreciated that a device attribute 504 for a given device can include only identifier 506 and value 508, while a separate device attribute specification can include extraction logic 510, comparison logic 512, alert logic 514, and adjustment logic 516. In addition, all or part of extraction logic 510, comparison logic 512, alert logic 514, and adjustment logic 516 can be common to attributes of a given type and can therefore be defined for the given type.

Transaction flow diagram 300 (FIG. 3) illustrates the use of authentication server 108 to authenticate device 102 and its user with server 106.

Figure 3:
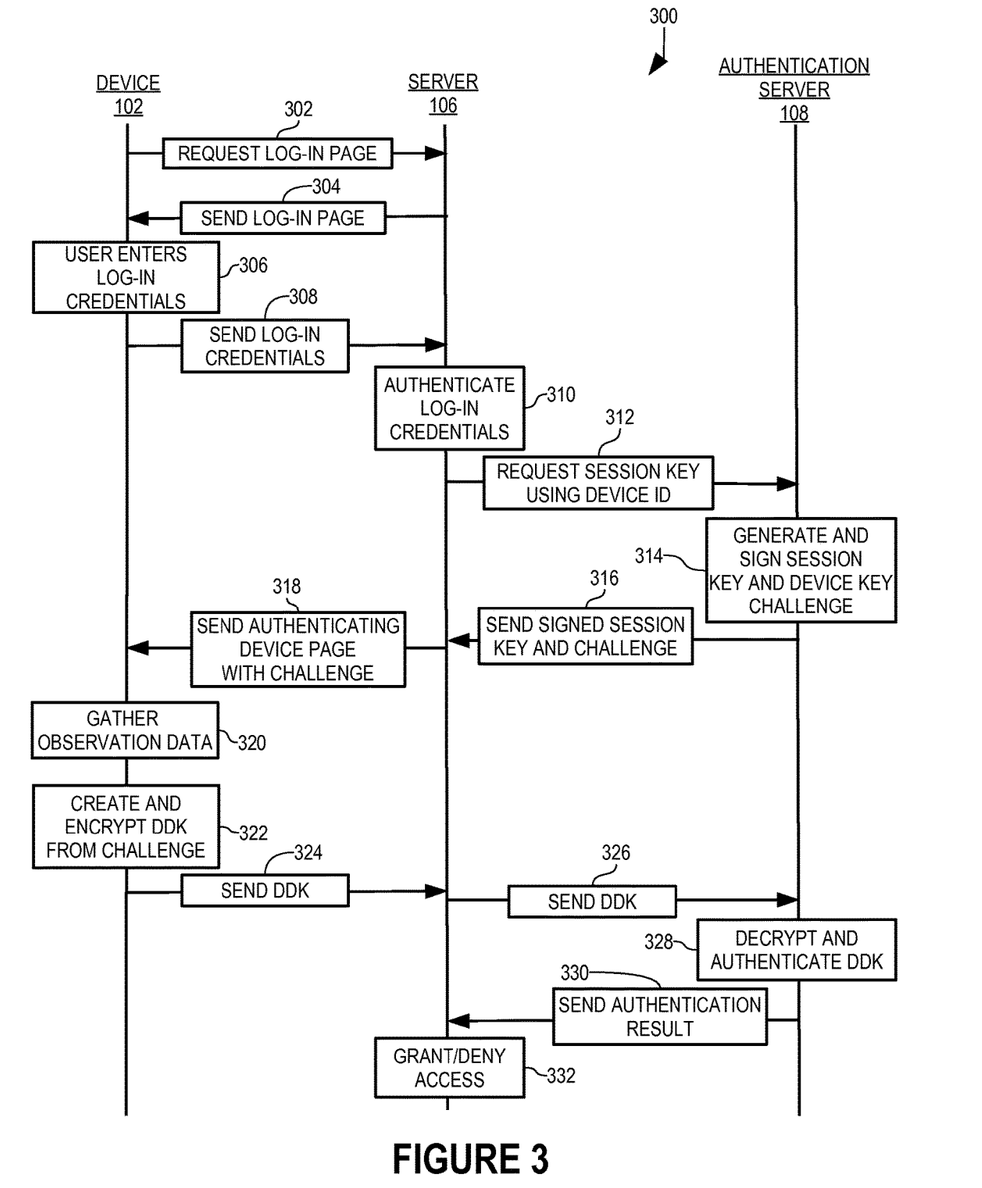
FIG. 3 is a transaction flow diagram illustrating the manner in which the device, the server, and the authentication server of FIG. 1 cooperate to authenticate the device and its user.

In step 302, device 102 sends a request for a log-in web page to server 106 by which the user can authenticate herself. The request can be in the form of a URL specified by the user of device 102 using web browser 1120 (FIG. 11) and conventional user interface techniques involving physical manipulation of user input devices 1108.

In step 304 (FIG. 3), server 106 sends the web page that is identified by the request received in step 302. In this illustrative example, the web page sent to device 102 includes content that defines a user interface by which the user of device 102 can enter her authentication credentials, such as a user name and associated password for example.

In step 306, web browser 1120 (FIG. 11) of device 102 executes the user interface and the user of device 102 enters her authentication credentials, e.g., by conventional user interface techniques involving physical manipulation of user input devices 1108. While the user is described as authenticating herself in this illustrative example, it should be appreciated that device 102 can be authenticated without also requiring that the user of device 102 is authenticated.

In step 308 (FIG. 3), device 102 sends the entered authentication credentials to server 106. In this illustrative embodiment, device 102 also sends an identifier of itself along with the authentication credentials. Server 106 authenticates the authentication credentials in step 310, e.g., by comparison to previously registered credentials of known users. If the credentials are not authenticated, processing according to transaction flow diagram 300 terminates and the user of device 102 is denied access to services provided by server 106. Conversely, if server 106 determines that the received credentials are indeed authentic, processing according to transaction flow diagram 300 continues.

In step 312 (FIG. 3), server 106 sends a request to authentication server 108 for a session key using the device identifier received with the authentication credentials.

In response to the request, authentication server 108 generates and cryptographically signs a session key. Session keys and their generation are known and are not described herein. In addition, authentication server 108 creates a device key challenge and encrypts the device key challenge using a public key of device 102 and PKI.

To create the device key challenge, authentication server 108 retrieves the known device record 500 (FIG. 5) representing device 102 using the received device identifier and comparing it to device identifier 502. The device key challenge specifies all or part of one or more of device attributes 504 to be included in the device key and is described in greater detail below.

In step 316 (FIG. 3), authentication server 108 sends the signed session key and the encrypted device key challenge to server 106.

In step 318, server 106 sends an "authenticating" page to device 102 along with the device key challenge. The "authenticating" page includes content that provides a message to the user of device 102 that authentication of device 102 and its user is underway and content that causes device 102 to produce a dynamic device key in the manner specified by the device key challenge.

The device key challenge causes web browser 1120 (FIG. 11) of device 102 to generate a device identifier, sometimes referred to herein as a dynamic device key (DDK) for device 102, e.g., dynamic device key 1142. In one embodiment, a web browser plug-in 1122 is installed in client device 102 and, invoked by web browser 1120, processes the content of the web page to generate the DDK. In other embodiments, DDK 1142 of device 102 can be generated by other forms of logic of device 102, such as DDK generator 1140, which is a software application installed in device 102.

The device key challenge specifies the manner in which DDK 1142 is to be generated from the attributes of device 102 represented in device attributes 504 (FIG. 5). The challenge specifies a randomized sampling of attributes of device 102, allowing the resulting DDK 1142 to change each time device 102 is authenticated. There are a few advantages to having DDK 1142 represent different samplings of the attributes of device 102. One is that any data captured in a prior authentication of device 102 cannot be used to spoof authentication of device 102 using a different device when the challenge has changed. Another is that, since only a small portion of the attributes of device 102 are used for authentication at any time, the full set of attributes of device 102 cannot be determined from one, a few, several, or even many authentications of device 102.

The device key challenge specifies items of information to be collected from hardware and system configuration attributes of device 102 and the manner in which those items of information are to be combined to form DDK 1142. In this embodiment, the challenge specifies one or more state changes of hardware elements of device 102 to be observed by the user of device 102.

To provide greater security, DDK 1142 includes data representing the observation data obfuscated using a nonce included in the challenge.

Figure 8:
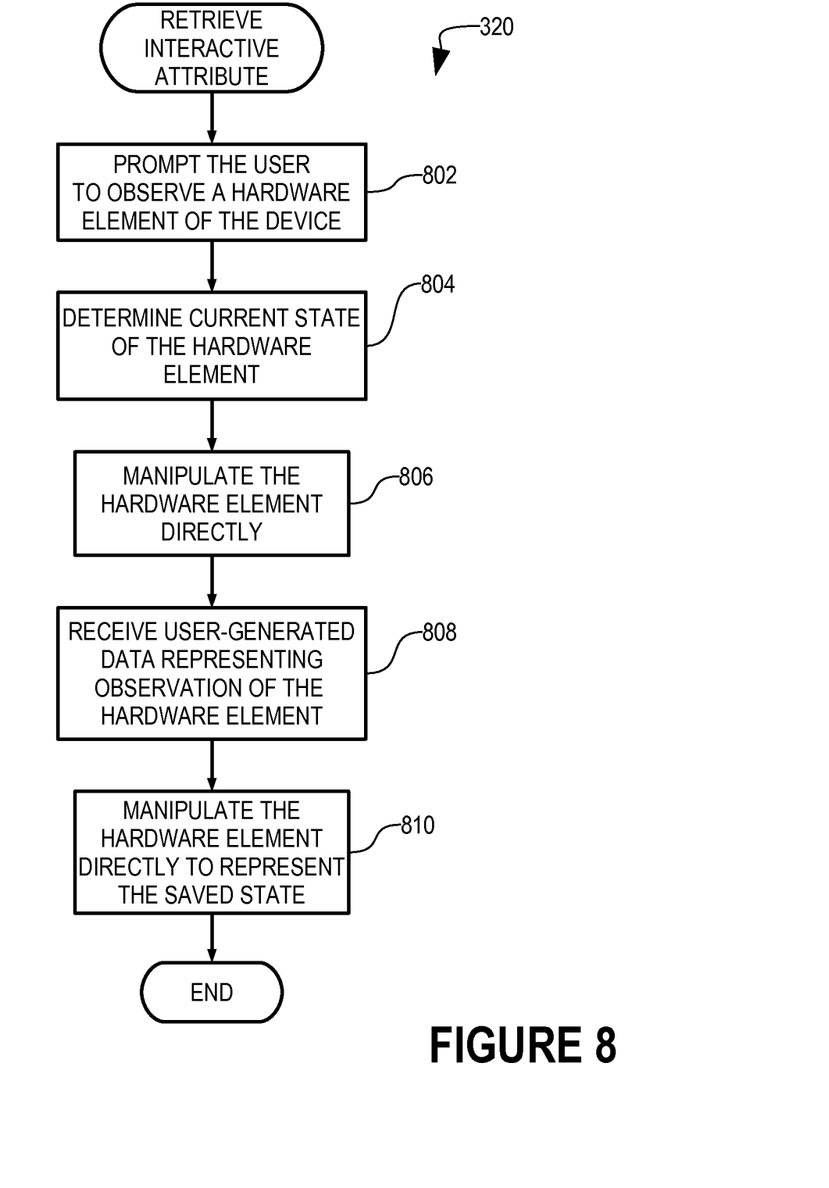
FIG. 8 is a logic flow diagram illustrating the extraction of environmental data representing performance of a gesture in response to a device key challenge for authentication of the device.

In step 320 (FIG. 3), device 102 gathers observation data for inclusion in the DDK according to the device key challenge. Step 320 is shown in greater detail as logic flow diagram 320 (FIG. 8). There are a few aspects of the context of logic flow diagram 320 that are helpful to consider. First, direct I/O logic 1136 (FIG. 11) can control hardware elements of device 102 only. Direct I/O logic 1136 cannot control logic of a remotely located device through RDP server logic 1134. Second, in some embodiments, direct I/O logic 1136 can only set the state of hardware elements of device 102 and cannot query or otherwise determine the current state of those hardware elements.

In step 802, device 102 prompts the user to observe changes in the state of a hardware element of device 102. For example, device 102 can prompt the user to observe LED indicators of a keyboard of device 102 to see which LED indicator blinks and to count how many times it blinks. Other examples of hardware elements for which the user can be prompted to observe changes in state (visually or audibly) include LED indicators for other hardware elements of device 102 or for device 102 itself (e.g., Caps Lock, Num Lock, or Scroll Lock LEDs are illuminated), a motherboard speaker, an optical drive tray, various vibrators, speakers, and sensors on smart phones, and any other hardware element that cannot be observed by the RDP. For the foregoing hardware elements, examples of state changes include whether an LED illuminates or turns off, whether a speaker issues a tone or goes silent, whether a drive tray opens or closes, and whether a vibrator vibrates or turns off.

In step 804 (FIG. 8), device 102 determines the current state of the hardware element of device 102 to be manipulated. As noted above, direct I/O logic 1136 does not support such functionality in some embodiments. For example, DeviceIOControl of the WINDOWS® operating system does not allow a process to query the state of LED indicators of a keyboard. However, the WINDOWS® operating system includes data representing the state the LED indicators of a keyboard ought to be in. For example, while DeviceIOControl does not allow a process to directly determine whether a Caps Lock LED indicator on a keyboard is illuminated, the WINDOWS® operating system allows a process to determine whether the Caps Lock functionality is active, i.e., whether all lower case letters entered by the user are automatically converted to upper case and vice versa. Accordingly, in step 804, device 102 determines the current state of the hardware element of device 102 directly or, when that's not feasible, determines what the current state of the hardware element ought to be indirectly.

In step 806, device 102 manipulates the hardware element of device 102 through direct I/O logic 1136 in a manner specified in the DDK challenge. In the example in which the user is prompted to observe the LED indicators of the keyboard of device 102, device 102 causes one or more of the LED indicators of the keyboard to flash a predetermined number of times, or in a predetermined sequence. In another example, device 102 causes the LED indicators of the keyboard to flash one at a time in a predetermined sequence, which may consist of a single flash or multiple flashes of one or more of the LEDS.

In step 808, device 102 receives user-generated observation data representing the state changes observed by the user. For example, device 102 causes the LED indicator of the Caps Lock key to flash three (3) times, then user enters the observation data using a conventional and known graphical user interface, for example, by typing the number 3 into a field associated with the Caps Lock key. In another example, device 102 causes the LED indicator of the Num Lock key to flash a certain number of times and the user provides confirmatory observation data by pressing the Num Lock key the same number of times.

Step 810 (FIG. 8) ensures that, post challenge and response, the final state of the hardware element is restored to, or remains the same as, the current states of the hardware element that was observed in step 804. For the case where, during a challenge session, device 102 causes LED indicators of the keyboard to flash a predetermined number of times, without prompting a key-press response from the user, no change of state in the hardware elements occurs. In this case, user confirmatory responses are input to device 102 by way of the GUI. Since none of Caps Lock, Num Lock, or Scroll Lock key is pressed during the challenge session, the final state for these hardware elements will be unchanged from what was observed in the current state. This sequence is depicted in the first exemplary state table below:

| Hardware | Initial State | 1st Challenge | 2nd Challenge | 3rd Challenge | Final State |
|---|---|---|---|---|---|
| Caps Lock | 0 | FLASH 3 times | | | 0 |
| Num Lock | 1 | | FLASH 2 times | | 1 |
| Scroll Lock | 0 | | | FLASH 4 times | 0 |

In another example, in which the user is prompted to press keys to enter confirmatory observation data, the user may cause one or more of the hardware elements to change to a state in disagreement with its corresponding LED illumination state. This is because during the challenge sessions, as each LED flashes, the user presses the corresponding key, causing a change in hardware state with each press. This sequence is depicted in the second exemplary state table below:

| Hardware | Initial State | 1st Challenge | 2nd Challenge | 3rd Challenge | Final State |
|---|---|---|---|---|---|
| Caps Lock | 0 | | FLASH 1 time | | 1 |
| Num Lock | 1 | FLASH 1 time | | FLASH 1 time | 1 |
| Scroll Lock | 0 | | | | 0 |

Post challenge session, these hardware elements can be restored to their initial states when the user presses the key normally. For example, if post challenge, a key press causes an LED such as the Caps Lock LED to illuminate, indicating Caps Lock on when the Caps Lock hardware element is actually off, a subsequent press of the Caps Lock key will cause the direct I/O logic 1136 to turn the hardware element on and illuminate the Caps Lock LED, resulting in the LED remaining illuminated, thus restoring agreement. Thus, in this example, in step 810, device 102 uses direct I/O logic 1136 to set the final state of the hardware element to what was observed in step 804. In one embodiment, in step 810 device 102 prompts the user via the GUI to press one or more keys to restore agreement. After step 810, processing according to logic flow diagram 320, and therefore step 320 (FIG. 3), completes.

In step 322, device 102 creates and encrypts dynamic device key (DDK) 1142 (FIG. 11) in a manner specified by the DDK challenge. The DDK challenge can cause device 102 to include the observation data gathered in step 320 in the DDK, typically obfuscated, e.g., with a nonce. Alternatively, the DDK challenge can cause device 102 to compare the gathered observation data to predetermined correct observation data and to fail authentication upon a condition in which the gathered observation data does not match the predetermined correct observation data.

Once DDK 1142 (FIG. 11) is generated according to the received device key challenge, device 102 encrypts DDK 1142 using a public key of authentication server 108 and PKI.

In step 324 (FIG. 3), device 102 sends the encrypted dynamic device key to server 106, and server 106 sends the encrypted dynamic device key to authentication server 108 in step 326.

Figure 6:
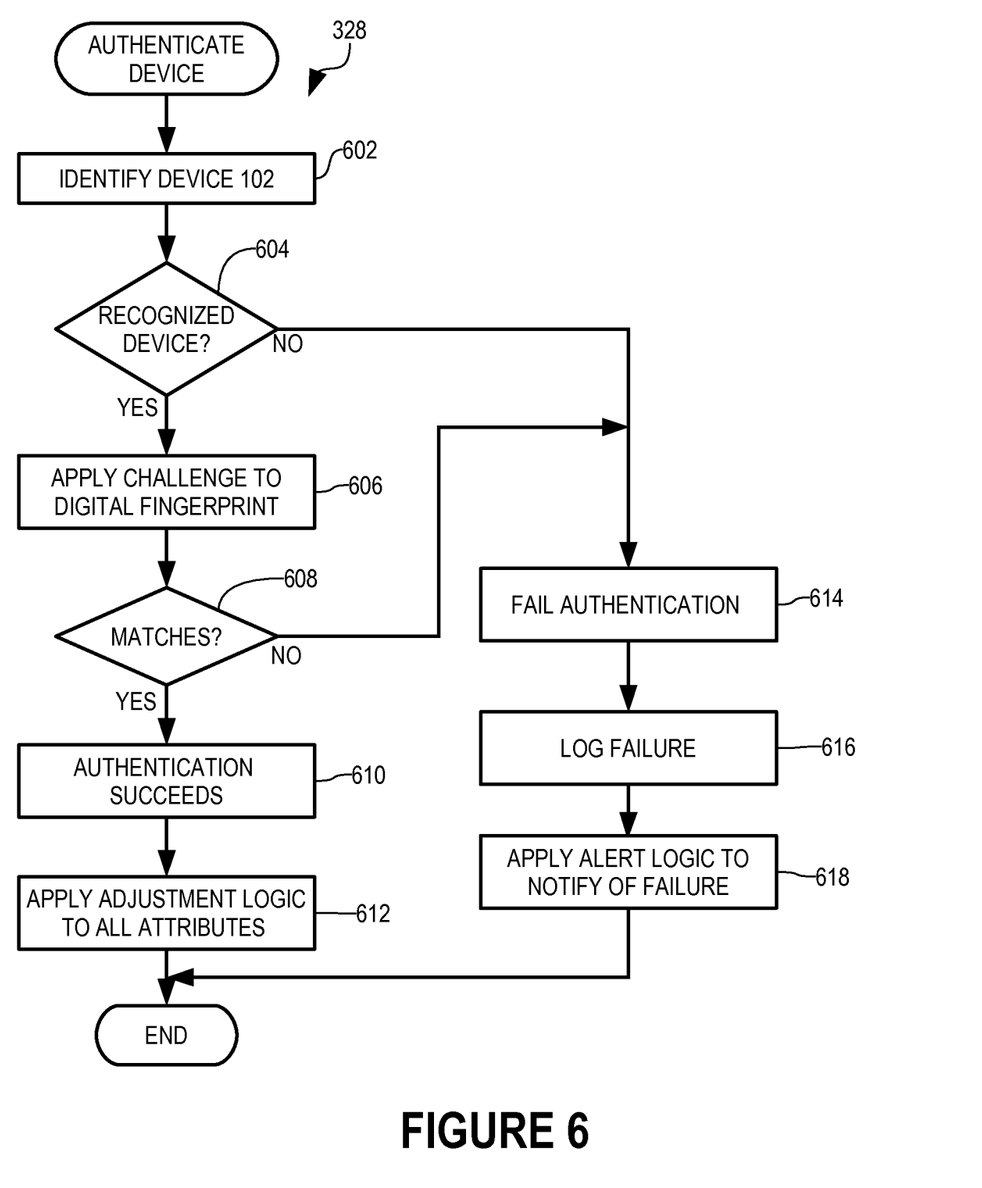
FIG. 6 is a logic flow diagram of an authentication process by which the authentication server authenticates the device and its user.

In step 328, authentication logic 1020 of authentication server 108 decrypts and authenticates the received DDK. Step 328 is shown in greater detail as logic flow diagram 328 (FIG. 6).

In step 602, authentication logic 1020 identifies device 102. In this illustrative embodiment, the received DDK includes a device identifier corresponding to device identifier 502 (FIG. 5). Authentication logic 1020 identifies device 102 by locating a known device record 500 in which device identifier 502 matches the device identifier of the received DDK.

In test step 604 (FIG. 6), authentication logic 1020 determines whether device 102 is identified. In particular, authentication logic 1020 determines whether a known device record with a device identifier matching the device identifier of the received DDK is successfully found in known device data 1030. If so, processing transfers to step 606. Otherwise, processing transfers to step 614, which is described below.

In step 606, authentication logic 1020 applies the same device key challenge sent in step 318 (FIG. 3) to the known device record 500 (FIG. 5) that corresponds to the identified device. In this illustrative embodiment, the device key challenge produces a DDK in which a portion of the DDK generated from non-interactive attributes can be parsed from a portion generated from interactive attributes, i.e., attributes that require response from the user of device 102, such that device 102 can be authenticated separately from the user of device 102.

In test step 608 (FIG. 6), authentication logic 1020 determines whether the received DDK authenticates device 102 and its user by comparing the resulting DDK of step 606 to the received DDK. In this illustrative embodiment, authentication logic 1020 uses comparison logic 512 (FIG. 5) for each of the device attributes 504 included in the device key challenge. For attributes in which the user is to observe and report state changes in a hardware element of device 102 and in which the gathered observation data is included in the DDK, comparison logic 512 in this illustrative embodiment includes logic by which observation data represented in the received DDK is determined to match the predetermined correct observation data to accurately represent the state changes effected by device 102 in step 806 (FIG. 8).

If the received DDK does not authenticate device 102, processing transfers to step 614 (FIG. 6) and authentication fails or, alternatively, to step 314 (FIG. 3) in which authentication logic 1020 sends another device key challenge to re-attempt authentication. If the received DDK authenticates device 102, processing transfers to step 610.

In step 610, authentication logic 1020 determines that device 102 is successfully authenticated.

In step 612 (FIG. 6), authentication logic 1020 applies adjustment logic 516 (FIG. 5) of each of device attributes 504 uses to generate the received DDK. For example, adjustment logic 516 can cause value 508 of the known device record 500 found in test step 604 to be updated to reflect any changes in available hardware access methods of device 102. After step 612 (FIG. 6), processing according to logic flow diagram 328, and therefore step 328, completes. As described above, authentication failure at either of test steps 604 and 608 transfers processing to step 614.

In step 614, authentication logic 1020 determines that device 102 or its user is not authentic, i.e., that authentication according to logic flow diagram 328 fails.

In step 616, authentication logic 1020 logs the failed authentication and, in step 618, applies alert logic 514 (FIG. 5) to notify various entities of the failed authentication. After step 618 (FIG. 6), processing according to logic flow diagram 328, and therefore step 328, completes.

In step 330 (FIG. 3), authentication server 108 sends data representing the result of authentication of device 102 to server 106.

In step 332, server 106 determines whether to continue to interact with device 102 and in what manner according to the authentication results received in step 328.

Figure 9:
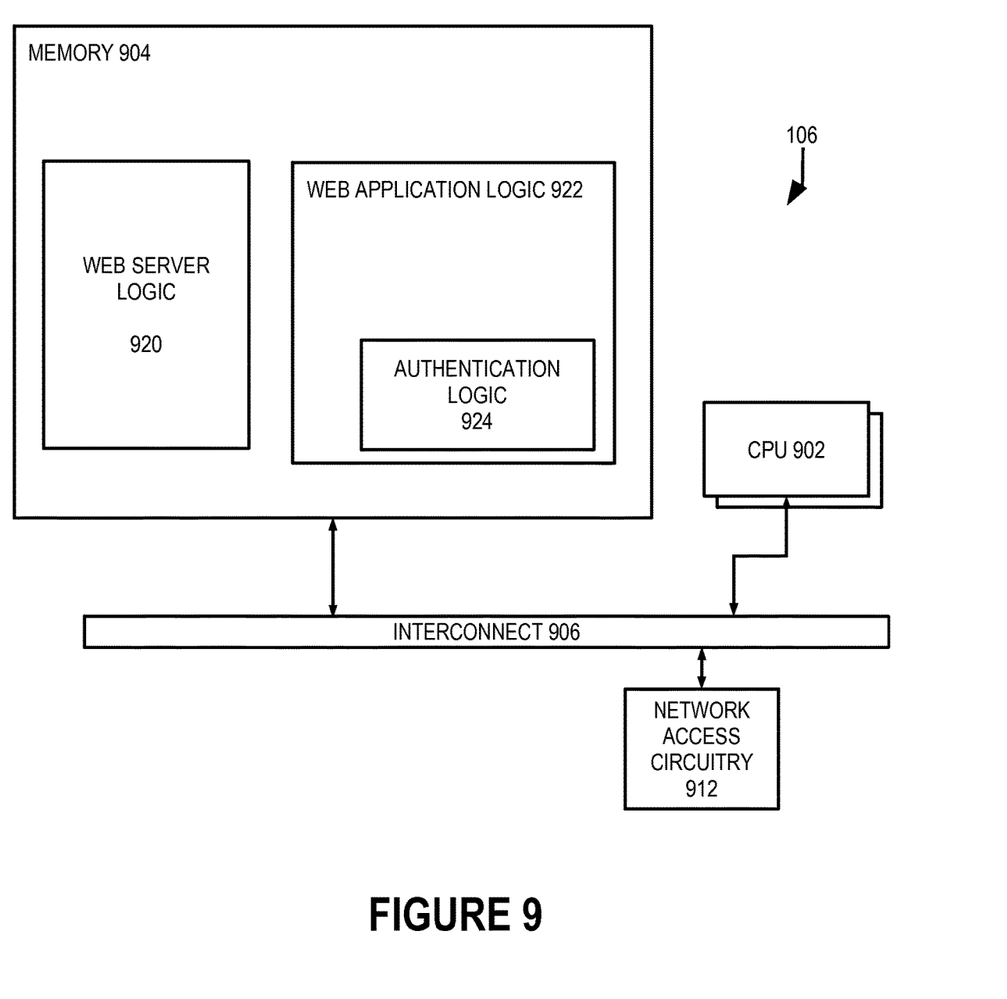
FIG. 9 is a block diagram showing in greater detail the server of FIG. 1.

Server computer 106 is shown in greater detail in FIG. 9. Server 106 includes one or more microprocessors 902 (collectively referred to as CPU 902) that retrieve data and/or instructions from memory 904 and execute retrieved instructions in a conventional manner. Memory 904 can include generally any computer-readable medium including, for example, persistent memory such as magnetic and/or optical disks, ROM, and PROM and volatile memory such as RAM.

Figure 1:
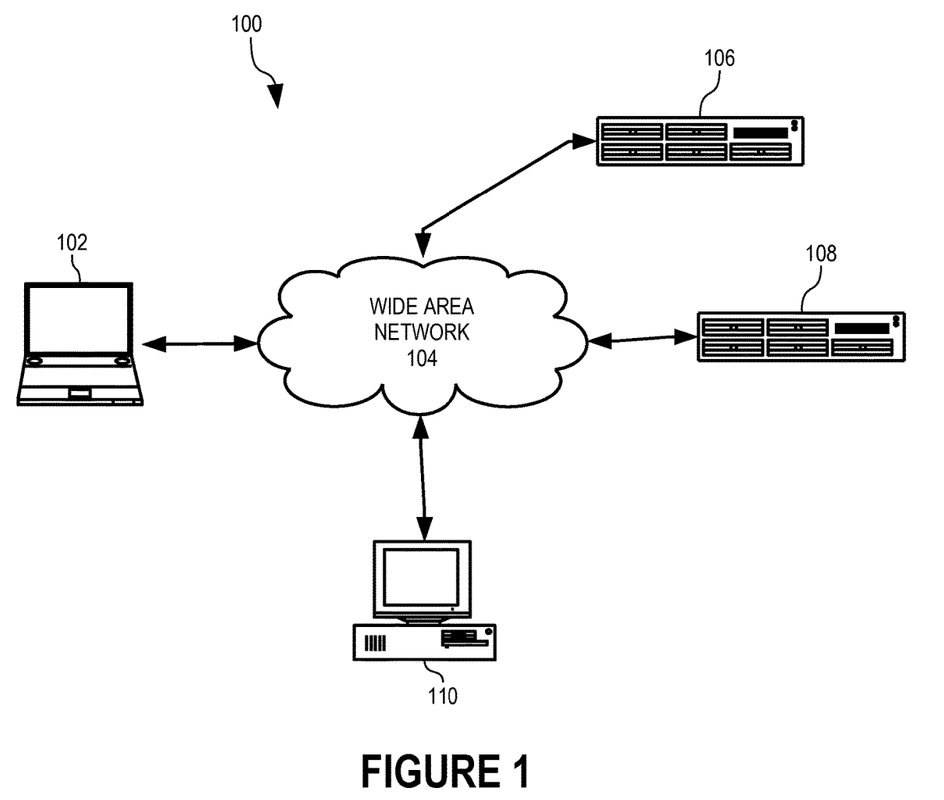
FIG. 1 is a diagram showing a computing device, a server, and an authentication server that cooperate to identify and authenticate the device in accordance with one embodiment of the present invention.

CPU 902 and memory 904 are connected to one another through a conventional interconnect 906, which is a bus in this illustrative embodiment and which connects CPU 902 and memory 904 to network access circuitry 912. Network access circuitry 912 sends and receives data through computer networks such as wide area network 104 (FIG. 1).

A number of components of server 106 are stored in memory 904. In particular, web server logic 920 and web application logic 922, including authentication logic 924, are all or part of one or more computer processes executing within CPU 902 from memory 904 in this illustrative embodiment but can also be implemented using digital logic circuitry.

Web server logic 920 is a conventional web server. Web application logic 922 is content that defines one or more pages of a web site and is served by web server logic 920 to client devices such as device 102. Authentication logic 924 is a part of web application logic 922 that causes client devices and their users to authenticate themselves in the manner described above.

Figure 10:
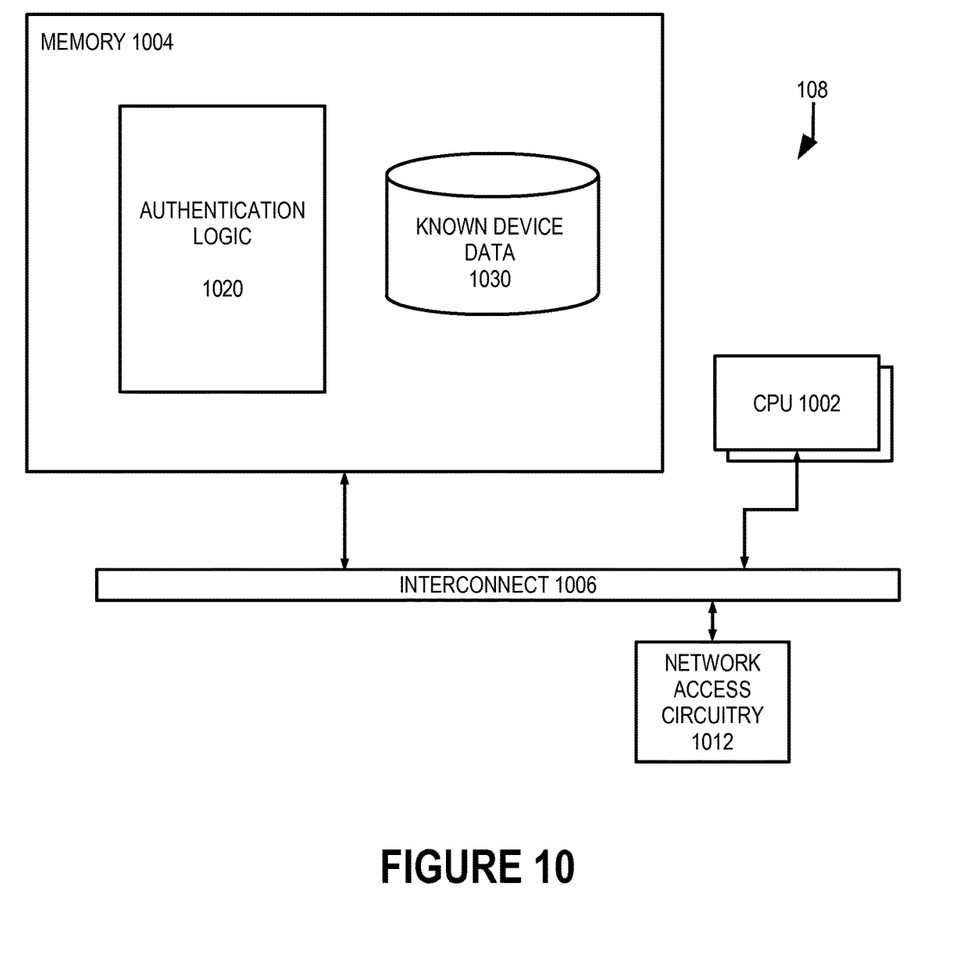
FIG. 10 is a block diagram showing in greater detail the authentication server of FIG. 1.

Authentication server 108 is shown in greater detail in FIG. 10. Authentication server 108 includes one or more microprocessors 1002 (collectively referred to as CPU 1002), memory 1004, a conventional interconnect 1006, and network access circuitry 1012, which are directly analogous to CPU 902 (FIG. 9), memory 904, conventional interconnect 906, and network access circuitry 912, respectively.

A number of components of authentication server 108 (FIG. 10) are stored in memory 1004. In particular, authentication logic 1020 is all or part of one or more computer processes executing within CPU 1002 from memory 1004 in this illustrative embodiment but can also be implemented using digital logic circuitry. Known device data 1030 is data stored persistently in memory 1004. In this illustrative embodiment, known device data 1030 is organized as all or part of one or more databases.

Device 102 is a personal computing device and is shown in greater detail in FIG. 11. Device 102 includes one or more microprocessors 1102 (collectively referred to as CPU 1102) that retrieve data and/or instructions from memory 1104 and execute retrieved instructions in a conventional manner. Memory 1104 can include generally any computer-readable medium including, for example, persistent memory such as magnetic and/or optical disks, ROM, and PROM and volatile memory such as RAM.

CPU 1102 and memory 1104 are connected to one another through a conventional interconnect 1106, which is a bus in this illustrative embodiment and which connects CPU 1102 and memory 1104 to one or more input devices 1108, output devices 1110, and network access circuitry 1112. Input devices 1108 can include, for example, a keyboard, a keypad, a touch-sensitive screen, a mouse, a microphone, and one or more cameras. Output devices 1110 can include, for example, a display—such as a liquid crystal display (LCD)—and one or more loudspeakers. Network access circuitry 1112 sends and receives data through computer networks such as wide area network 104 (FIG. 1).

A number of components of device 102 are stored in memory 1104. In particular, web browser 1120 is all or part of one or more computer processes executing within CPU 1102 from memory 1104 in this illustrative embodiment but can also be implemented using digital logic circuitry. As used herein, "logic" refers to (i) logic implemented as computer instructions and/or data within one or more computer processes and/or (ii) logic implemented in electronic circuitry. Web browser plug-ins 1122 are each all or part of one or more computer processes that cooperate with web browser 1120 to augment the behavior of web browser 1120. The manner in which behavior of a web browser is augmented by web browser plug-ins is conventional and known and is not described herein.

Operating system 1130 is all or part of one or more computer processes executing within CPU 1102 from memory 1104 in this illustrative embodiment but can also be implemented using digital logic circuitry. An operating system (OS) is a set of programs that manage computer hardware resources and provide common services for application software such as web browser 1120, web browser plug-ins 1122, and DDK generator 1140.

DDK generator 1140 is all or part of one or more computer processes executing within CPU 1102 from memory 1104 in this illustrative embodiment but can also be implemented using digital logic circuitry. DDK generator 1140 facilitates authentication of device 102 in the manner described above.

Dynamic device key 1142 is data stored persistently in memory 1104.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A computer-implemented method for determining that a person is in physical possession of a remotely located device, the method comprising:

causing the remotely located device to provide a prompt to a user of said remotely located device to observe changes in a state of a hardware element of the remotely located device, the hardware element selected from the group consisting of LED indicator, motherboard speaker, optical drive tray, smart phone vibrator, smart phone speaker, and smart phone sensor;

the remotely located device effecting, separate from providing said prompt to said user, one or more physical manipulations of the state of the hardware element that are not detectable by a remote desktop protocol executing in the remotely located device;

causing the remotely located device to receive user-generated observation data representing the person's observations regarding the physical manipulations of the state of the hardware element;

comparing the observation data to reference observation data that represents the physical manipulations of the state of the hardware element; and determining that the user is in physical possession of the remotely located device upon determining that the observation data matches the reference observation data.

2. The method of claim 1, wherein the one or more physical manipulations of the state of the hardware device comprise:
   turning the LED indicator on or off.

3. The method of claim 2 wherein the LED indicator is on a keyboard.

4. A non-transitory tangible computer readable medium useful in association with a computer that includes one or more processors and a memory, the non-transitory computer readable medium including computer instructions that are configured to cause the computer, by execution of the computer instructions in the one or more processors from the memory, to determine that a person is in physical possession of a remotely located device by at least:
   causing the remotely located device to provide a prompt to a user of said remotely located device to observe changes in a state of a hardware element of the remotely located device, the hardware element selected from the group consisting of LED indicator, motherboard speaker, optical drive tray, smart phone vibrator, smart phone speaker, and smart phone sensor;
   the remotely located device effecting, separate from providing said prompt to said user, one or more physical manipulations of the state of the hardware element that are not detectable by a remote desktop protocol executing in the remotely located device;
   causing the remotely located device to receive user-generated observation data representing the person's observations regarding the physical manipulations of the state of the hardware element;
   comparing the observation data to reference observation data that represents the physical manipulations of the state of the hardware element; and
   determining that the user is in physical possession of the remotely located device upon determining that the observation data matches the reference observation data.

5. The method of claim 1 wherein the manner that prevents the physical manipulations from being detectable by a remote desktop protocol executing in the remotely located device also prevents the physical manipulations from being detectable by WINDOWS® manager executing in the remotely located device.

6. A non-transitory tangible computer readable medium useful in association with a computer that includes one or more processors and a memory, the non-transitory computer readable medium including computer instructions that are configured to cause the computer, by execution of the computer instructions in the one or more processors from the memory, to determine that a person is in physical possession of a remotely located device by at least:
   causing the remotely located device to provide a prompt to a user of said remotely located device to observe changes in a state of a hardware element of the remotely located device other than a change to a display screen of the remotely located device;
   the remotely located device effecting, separate from providing said prompt to said user, one or more physical manipulations of the state of the hardware element other than a change to a display screen of the remotely located device that are not detectable by a remote desktop protocol executing in the remotely located device;
   causing the remotely located device to receive user-generated observation data representing the person's observations regarding the physical manipulations of the state of the hardware element;
   comparing the observation data to reference observation data that represents the physical manipulations of the state of the hardware element; and
   determining that the user is in physical possession of the remotely located device upon determining that the observation data matches the reference observation data.

7. The computer readable medium of claim 6 wherein the one or more physical manipulations of the state of the hardware device comprise:
   turning the LED indicator on or off.

8. The computer readable medium of claim 7 wherein the LED indicator is on a keyboard.

9. A computer system comprising:
   at least one processor;
   a computer readable medium that is operatively coupled to the processor;
   network access circuitry that is operatively coupled to the processor; and
   authentication logic (i) that executes at least in part in the processor from the computer readable medium and (ii) that, when executed, causes the processor to determine that a person is in physical possession of a remotely located device by at least:
   causing the remotely located device to provide a prompt to a user of said remotely located device to observe changes in a state of a hardware element of the remotely located device, the hardware element selected from the group consisting of LED indicator, motherboard speaker, optical drive tray, smart phone vibrator, smart phone speaker, and smart phone sensor;
   the remotely located device effecting, separate from providing said prompt to said user, one or more physical manipulations of the state of the hardware element that are not detectable by a remote desktop protocol executing in the remotely located device;
   causing the remotely located device to receive user-generated observation data representing the person's observations regarding physical manipulations of the state of the hardware element;
   comparing the observation data to reference observation data that represents the physical manipulations of the state of the hardware element; and
   determining that the user is in physical possession of the remotely located device upon determining that the observation data matches the reference observation data.

10. The computer readable medium of claim 6 wherein the manner that prevents the physical manipulations from being detectable by a remote desktop protocol executing in the remotely located device also prevents the physical manipulations from being detectable by a WINDOWS® manager executing in the remotely located device.

11. A computer system comprising:
    at least one processor;
    a computer readable medium that is operatively coupled to the processor;
    network access circuitry that is operatively coupled to the processor; and
    authentication logic (i) that executes at least in part in the processor from the computer readable medium and (ii)

that, when executed, causes the processor to determine that a person is in physical possession of a remotely located device by at least:

causing the remotely located device to provide a prompt to a user of said remotely located device to observe changes in a state of a hardware element of the remotely located device other than a change to a display screen of the remotely located device;

the remotely located device effecting, separate from providing said prompt to said user, one or more physical manipulations of the state of the hardware element other than a change to a display screen of the remotely located device that are not detectable by a remote desktop protocol executing in the remotely located device;

causing the remotely located device to receive user-generated observation data representing the person's observations regarding physical manipulations of the state of the hardware element;

comparing the observation data to reference observation data that represents the physical manipulations of the state of the hardware element; and determining that the user is in physical possession of the remotely located device upon determining that the observation data matches the reference observation data.

12. The computer system of claim 11 wherein the one or more physical manipulations of the state of the hardware device comprise:

turning the LED indicator on or off.

13. The computer system of claim 12 wherein the LED indicator is on a keyboard.

14. The computer system of claim 11 wherein the authentication logic causes the computer to determine that a person is in physical possession of a remotely located device by at least also:

causing the remotely located device to determine a starting state of the hardware element prior to effecting the one or more physical manipulations of the state of the hardware element; and causing the remotely located device to restore the starting state of the hardware element after effecting the one or more physical manipulations of the state of the hardware element.

15. The computer system of claim 11 wherein the manner that prevents the physical manipulations from being detectable by a remote desktop protocol executing in the remotely located device also prevents the physical manipulations from being detectable by a Windows® manager executing in the remotely located device.

\* \* \* \* \*